UNITED STATES PATENT OFFICE.

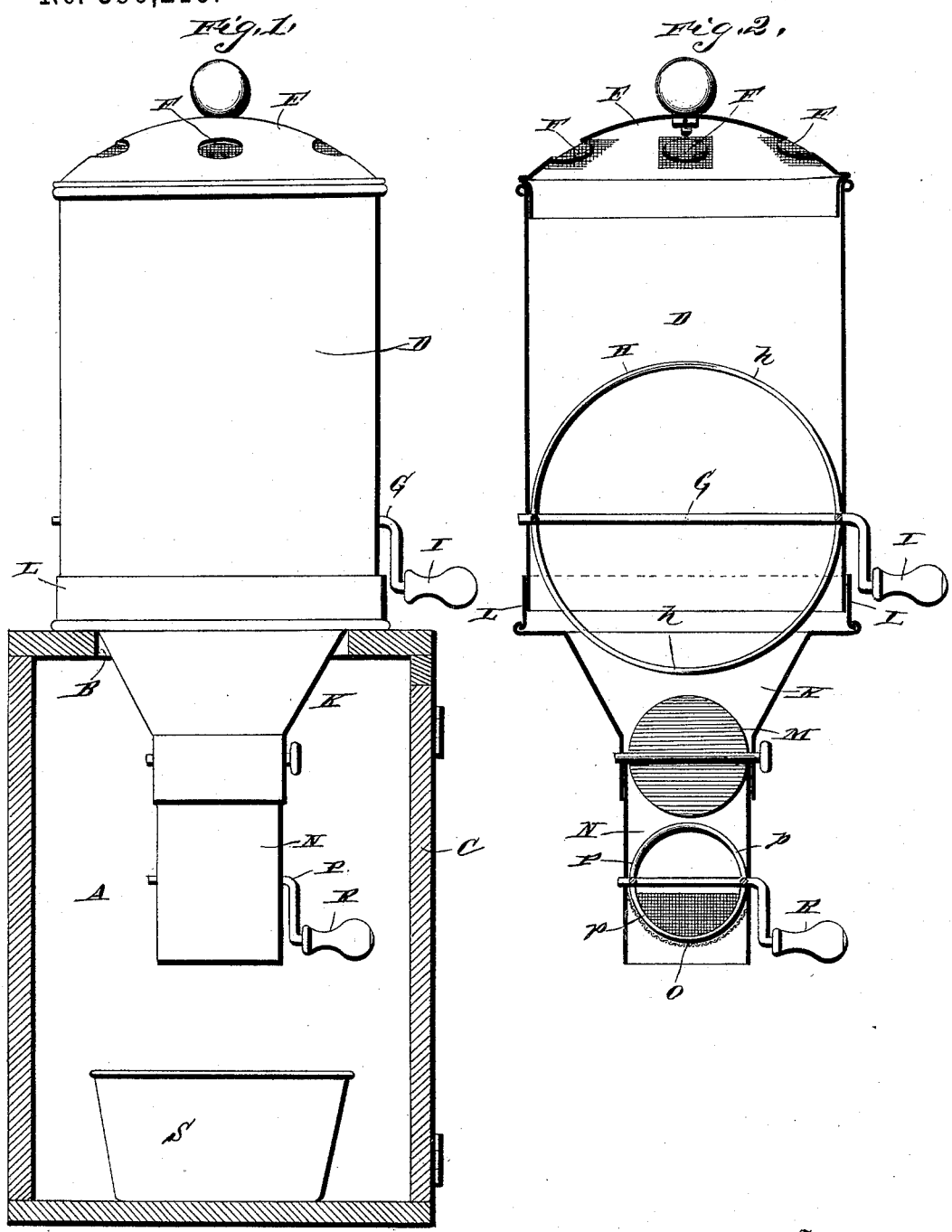

HORACE FOSTER, SR., OF KNOXVILLE, TENNESSEE.

FLOUR SAFE AND SIFTER.

SPECIFICATION forming part of Letters Patent No. 390,219, dated October 2, 1888

Application filed January 21, 1888. Serial No. 261,520. (No model.)

*To all whom it may concern:*

Be it known that I, HORACE FOSTER, Sr., a citizen of the United States, residing at Knoxville, in the county of Knox and State of Tennessee, have invented a new and useful Improvement in Flour Safes and Sifters, of which the following is a specification.

My invention relates to a flour safe and sifter; and it consists in a certain novel construction and arrangement of devices which are more fully set forth hereinafter in connection with the accompanying drawings, wherein—

Figure 1 is a front view of the improved device. Fig. 2 is a vertical central section thereof.

Referring by letter to the drawings, A designates the cabinet having an opening, B, in its top and provided with the door C in one side. This cabinet is designed to hold the dish or vessel into which the sifted flour is to be deposited; and it is also designed as a support for the sifter, as will be hereinafter more fully explained.

D designates the body of the sifter or the bin, which is cylindrical in form and is provided at its upper end with a cover, E. Apertures or vents F F are arranged in the cover of the bin, near its outer edge, and they are covered with screens to prevent the dust from passing therethrough. A transverse shaft, G, is mounted in the bin, near its lower end, and it is provided within the bin with an agitator, H, and without the bin with the handle I. The agitator consists of a series of intersecting wire rings, h h.

K designates a hopper which is provided at its upper edge with a vertical flange, L, which embraces the lower edge of the bin. At the lower end of this hopper is a valve, M, which is mounted in the sides thereof, and is adapted to either allow the contents of the bin to pass through the hopper, or to prevent the same, according to the position in which it is adjusted.

The body D of the bin is cylindrical, of the same internal breadth and capacity at top and bottom. The agitator is circular, of a shape corresponding to and substantially occupying the whole internal cross-area of the bin, and is journaled across the bin so near the bottom thereof as to sweep into the hopper when revolving. There is thus no chance for the flour to clog either above or below the agitator. The flange L embraces the lower end of the bin, and thereby maintains the bin in proper position over the hopper. The bin can be readily lifted from engagement with said flange, however, when so desired.

The short tube N is fitted on the lower end of the hopper, and is provided at its lower end with the cup-shaped or semicircular-shaped screen O. The agitator P is mounted in the tube N, just above the screen, so that its intersecting rings p p rub the surface of the screen. This agitator is provided with a handle, R, to enable it to be rotated.

The lower end of the sifter is passed into the opening B in the top of the cabinet until the sides of the hopper bear against the sides of the opening. The sifter is thus supported in a vertical position, with the lower end of its tube directly over a vessel, S, in the cabinet.

The operation of the device will be readily understood from the foregoing description. The flour is placed in the bin D, the valve is opened, and the agitator P is rotated to cause the flour to pass through the screen. At intervals (or continuously, if desired) the upper agitator, H, should be rotated to loosen the flour in the body and cause it to pass down to the screen. The tube N is detachable from the hopper, and the latter is detachable from the bin, thus enabling the device to be readily cleaned when it is necessary.

It will be readily seen from the foregoing that I have provided a detachable screen and agitator, and at the same time have a separate agitator for the bin and feed-hopper, independent of the screen-agitator, to prevent arching or choking of the material.

Having thus described my invention, I claim—

The improved flour-sifter herein described and shown, comprising the cylindrical bin D, the hopper K, having an annular vertical flange, L, fitting around the lower end of the bin, the rotary circular agitator H, journaled therein, near the lower end thereof, and extending across the same and into said hopper when in operation, the valve in the lower end of the hopper, the tube secured in and depending from the lower end of the hopper, the cup-shaped screen in the lower end of the tube, and the agitator in the tube working within and adjacent to said cup-shaped screen, as set forth.

In testimony that I claim the foregoing as my own I have hereto affixed my signature in presence of two witnesses.

HORACE FOSTER, SR.

Witnesses:
E. W. RYNO,
JNO. M. CONNER.